United States Patent Office 3,730,746
Patented May 1, 1973

---

3,730,746
SILICATE POLYMER VEHICLES FOR USE IN PROTECTIVE COATINGS AND PROCESS OF MAKING
Donald P. Boaz, 3917 Harvest Hill Road, Dallas, Tex. 75234
No Drawing. Continuation-in-part of application Ser. No. 749,587, Aug. 2, 1968. This application Sept. 8, 1970, Ser. No. 70,215
Int. Cl. C09d 5/10; C07g 17/00
U.S. Cl. 106—287 SE     16 Claims

ABSTRACT OF THE DISCLOSURE

Silicate polymer vehicles are obtained by partially hydrolyzing ethyl silicate and reacting the resultant composition with a vinyl, such as vinyl butyraldehyde and one or more additives such as a borate, a silane or a Lewis acid and cellulose to produce a vehicle for use in protective coatings of various kinds and particularly coatings for use on metal.

---

This is a continuation-in-part of my earlier filed copending application Ser. No. 749,587, filed Aug. 2, 1968, now abandoned.

Many silicate polymer vehicles are known including some which are used in coating compositions such as paints and the like. For the most part, however, the known vehicles have relatively short shelf lives, undesirable drying times, must be applied to precondition surfaces such as sandblasted surfaces to have a proper adhesion, are relatively soft and are easy scratched and worn, and are unable to hold pigments in suspension and therefore require frequent or constant agitation. Some known silicate polymer vehicles also become porous rather than forming a smooth continuous layer when dry which of course is not desirable for a protective coating.

Also various vehicles for protective coating substances and paints have been devised heretofore which have included as their additive ingredient a titanate substance. For the most part, paint vehicles which include only a titanate ingredient or additive usually can only be applied satisfactorily over surfaces which have been prepared in advance in some way such as by sandblasting. This is so because the titanate vehicles generally have relatively poor adhesive characteristics. The present invention, on the other hand, teaches the formulation of vehicles in which a borate additive, a silane additive or a Lewis acid additive is substituted for or used with a titanate additive. The present invention also teaches the use of combinations of two or more of these three additive ingredients in the same vehicle and in some cases it has also been found to be desirable to include a titanate in combination with one or several of these substances. The present application does not, however, cover a paint vehicle which includes only a titanate ingredient for the reasons mentioned above.

As will be explained, the use of one or a combination of the above named three ingredients produces improved vehicle adhesion characteristics and it also produces a more stable vehicle and one that has a longer shelf life. Paints formulated according to the present invention also provide better protection for the object or surface coated by being harder, tougher, and more resistant to temperature extremes. As will be explained hereinafter, the use of the above named additives and their proportion will to some extent affect the characteristics of the final product and it is anticipated that certain combinations of the additives will produce more suitable characteristics for certain applications than others and it is anticipated that some selection of the ingredients and their proportions may be necessary in some cases to produce the most desired final result or coating. It is also to be noted that the subject vehicle formulations are suitable for use in primers as well as in finish coats and these can be applied in all of the known ways for applying paints including by brushing, spraying, dipping and so on. The present vehicles can also be manufactured relatively quickly and easily with a minimum of equipment, and in those cases where certain of the reaction times may be relatively long these reactions can be carried out in the container in which the product is packaged for shipping or for storage.

The subject vehicles are formulated by partially hydrolyzing an ethyl silicate in a range from about 40% to about 100% and adding to the hydrolyzed solution cellulose and a vinyl material and thereafter adding one or more of the above named additives including borates, silanes, Lewis acids and titanate. In general, the use of a borate and a silane in combination has provided the best overall final product taking into account all of the characteristics usually desired for protective coatings. The use of a borate or a silane additive by themselves probably provides the next best overall product, and the use of a Lewis acid provides a desirable product for some purposes but has certain characteristics which may be less desirable than the above products. A Lewis acid may also be combined with a silane and/or a borate to produce a desired product and in some cases it may also be desired to add some titanate with the above as aforesaid. The subject paints or coatings can be applied to metal, masonry, and other types of surfaces and in general the final resin product will contain somewhere around twenty percent (20%) silicon dioxide (silica).

The present invention therefore teaches a new and useful group of silicate polymer vehicles and process for their manufacture which are particularly well suited for use in paints and other coating substances including those which are applied to metal or masonry. Such paints and coating substances also provide protection from heat and fire, and are relatively resistant to abrasion and scratching. Furthermore, by properly selecting one or more of the above mentioned additives and combining them with a partially hydrolyzed vinyl ethyl silicate polymer certain other desirable properties are also obtained including such things as shorter drying times and better adhesion characteristics, better pigment suspension characteristics, and improved hardness, toughness and stability characteristics.

It is therefore a principal object of the present invention to provide an improved vehicle for use in paints and other protective coating materials.

Another object is to provide an improved coating substance or paint.

Another object is to provide a vehicle for use in protective coatings which improves the adhesion characteristics thereof and enables them to be applied successfully event to surfaces that are not preconditioned in some way.

Another object is to provide more stable silicate polymer vehicles for use in protective coatings and the like.

Another object is to provide a paint vehicle which can be used in a finish as well as in a primer coating.

Another object is to provide a vehicle for protective coatings which can be manufactured quickly and economically and with a minimum of equipment.

Another object is to provide an improved vehicle for use in paints and like substances that will enable the substance to be applied by being sprayed, brushed or by dipping, which paint will form an inorganic protective coating for metal, masonry, and other materials.

Another object is to provide a vehicle in which a relatively large amount of a protective material and/or pigment such as zinc dust can be suspended.

Another object is to increase the shelf-life of silicate based paint vehicles.

Another object is to provide silicate polymer vehicles which improve the hardness and toughness characteristics of coating substances such as paints.

Another object is to provide a protective coating material that can be applied to untreated metal and like surfaces as well as to pickled and sandblasted metal surfaces.

Another object is to provide a vehicle for protective coatings that will accept various pigments such as iron oxide, titanium oxide, chromium oxide, carbon black and like substances without reacting therewith.

These and other objects and advantages of the present invention will become apparent after considering the following specification which describes several examples of vehicles formulated in accordance with the present invention, which vehicles are included by way of illustration and not by way of limitations.

EXAMPLE I

A resin solution is prepared by mixing under agitation:

| Ingredients: | Parts by weight |
| --- | --- |
| Cellosolve (ethylene glycol ethyl ether) | 13.45 |
| Ethanol 95 (95% ethyl alcohol and 5% water) | 6.73 |
| Ethyl cellulose | .82 |

The Cellosolve ingredient is a relatively slow solvent and is included to overcome the dry spray tendencies which are characteristic of faster solvents and the amount of Cellosolve that is used can be increased or decreased to vary the spraying and evaporating properties of the final product.

The ethyl cellulose is included in the mixture to give the final product the property of being able to hold a pigment in suspension which is highly desirable although a difficult to obtain property of most known protective coating substances. The amount of ethyl cellulose can also be varied to change the suspension and viscosity characteristics as desired. A typical range for the ethyl cellulose in the final product is from about 0.25% to about 15%.

The ethanol 95 ingredient is a non-reactive mutual solvent with the Cellosolve and the ethyl cellulose, and can be increased or decreased as long as the 5% water content is taken into account in the hydrolysis reaction which follows. The upper limit for the ethanol 95 ingredient would require the use of acid in butanol. The preparation of the solution, although usually done first as in this example, may be done after a later reaction which will be described, but if this is done a somewhat cloudy ester may result. Also, if ethanol 88, which is the commercial grade of ethanol were used for the ethanol 95, adjustment would be required for the water content that is free to react. Thus, if ethanol 88 were used, the amount of alcohol would be lowered and if acid in butanol were used, it would be raised to bring the total water to a desired level.

At room temperature or above and under agitation a hydrolysis reaction is performed by adding to the above resin solution the following materials in the amounts indicated:

| Ingredients: | Parts by weight |
| --- | --- |
| Butanol | 11.25 |
| Ethanol 95 | 11.25 |
| Ethyl silicate 40 (polysilicates averaging five silicon atoms per molecule with 40% $SiO_2$ minimum and 40% hydrolyzed) | 47.00 |
| 1% hydrochloric acid in water | 3.50 |

The butanol is included because it is a slower solvent than ethanol and provides for an evaporative balance between the ethanol and the Cellosolve. Furthermore, since the butanol contains no free water it does not affect the hydrolysis reaction. In slower evaporative versions of the present vehicle the butanol may be partially or completely replaced by Cellosolve. The 5% water in the ethanol 95 is calculated into the hydrolysis reaction but the ethanol 95 can be replaced by any water free non-reactive solvent mutual to Cellosolve and ethyl cellulose if sufficient water is then added to the mixture to make up the difference in the total water available for hydrolysis. Although any ethyl silicate such as tetraethylorthosilicate or condensed tetraethylorthosilicate is acceptable as an ingredient, ethyl silicate 40 is preferred for this example because it has a relatively higher silicate content and a lower cost compared to other commercially available ethyl silicates. The amount of ethyl silicate used in this example can be increased or decreased with the result that a resin having a higher or lower silicate content respectively will be produced. A typical range for the ethyl silicate ingredient is from about 10% to about 40% of the resulting vehicle. Acidified water such as the 1% HCl is used to further hydrolyze the ethyl silicate and to produce a nearly completely hydrolyzed resin suitable for curing on contact with moisture such as is found naturally in air. The amount of acidified water used will vary with the amount and type of ethyl silicate used. For example, $2(H_2O)$ completely hydrolyzes tetraethylorthosilicate and any lesser amount will partially hydrolyze the same silicate. The acid is included as a catalytic agent to speed hydrolysis and in addition is added to assure the stability of the resin formed. This is important since there is a tendency for precipitates to form when the hydrolysis is carried out in an alkaline environment. The amount of acid may be varied and in actual test mixtures have been reacted with resultant acid concentrations in the range from about .005 to 3.0%. It has also been observed that the shelf-life of resins having resultant acid concentrations of over about .1% is less than those with acid concentrations that are below this amount.

While the hydrolysis reaction between the water and the silicate is taking place agitation is usually not required. When the reaction is started at or near room temperature (approximately 70° F.) the hydrolysis usually takes about three hours to reach the point where there is no free water left. An exothermal temperature rise of about 30° to 40° F. and a 1% loss in volume can be expected during this reaction. Although room temperature is preferred for this reaction it is possible to carry it out at other temperatures ranging as high as 300° F. to reduce the time required to produce a satisfactory resin.

Once the hydrolysis reaction is complete, one part by weight of 10% vinyl resin in butanol is added to the above composition under agitation and allowed to react at room temperautre for a period of at least about five minutes to create a vinyl ethyl silicate resin. The vinyl which is predissolved in the water free butanol is usually a vinyl acetyl preferably of the vinyl butyraldehyde group. More or less vinyl can be added but using more vinyl sometimes adversely affects both the stability and the cure properties, and a range of from about .25 to about 5.0% vinyl in the final product is usually preferred to provide the most desirable resin.

The vinyl referred to is of the polyvinyl butyral group having medium to high molecular weight and an intrinsic viscosity in the range from about .81 to about 1.16. The composition of one particular resin used is given as containing polyvinyl acetate between about 0.05 to about 0.5%, polyvinyl alcohol between 19.5 and 20.0%, and the balance being polyvinyl butyral in the range from 79.5 to 80.45%. It is also contemplated to use polyvinyl formvar resin of a similar nature since it is possible to substitute the formvar type for the butyral type in some variations. The vinyl resins in the subject vehicles are used for increasing the adhesion and flexibility properties and to improve hot water resistance in the immersion service of the vehicles. The resin ester interchange takes place with the cellulose and silicate during the reaction period as they react to acidified conditions.

In order for the finished product to have the desired hardness characteristics and a rapid cure time an additive such as 5.00 parts by weight of 10% borate dissolved in butanol is added to the composition under agitation and allowed to react therewith. Various borates have been utilized for this purpose including the organo borates and boric acid. These include methyl borate and trimethyl or azeotrope type borates in butanol. It is not intended to limit the borates to those mentioned because it is also possible to carry out this reaction using other alcohol groups such as ethyl, isopropyl, isobutyl, and butyl. It can also be done using boric acid in a direction controlled reaction step. The borates used in the subject vehicles impart hardness to the coatings and reduce the required cure time. The azeotrope type has been found preferable and has been used to make a final product having from about 0.5 to about 6.0% borate. Even higher borate percentages can be obtained for some applications. For some specific uses, for example, a range from about 10% to about 15% is desirable. The reaction of the borate may be conducted at room temperature or higher and two to three days are usually required for a room temperature reaction to be completed. The cellulose previously added enters into the reaction by an ester interchange with the silicate terpolymer as it does in all the following examples also. The result is a resin containing about 20% $SiO_2$ in this example. There is no particular disadvantage in allowing this reaction to take place at room temperature since the desired pigment or protective material such as zinc dust or iron oxide is usually added to the vehicle at the site of use before the protective coating is applied. Therefore the mixture containing borate can finish its reaction in the vehicle container during shipment or storage. The subject vehicle as formulated will contain from about 60% to about 90% by weight of the resin bearing solvent, from about 10% to about 40% by weight of the hydrolyzed silicate and the additive which may be a borate, a Lewis acid, a silane, a titanate or a combination thereof will be present in an amount by weight of from about 0.5% to about 15.0%.

The vehicle described in this example can be mixed with relatively large quantities of zinc dust to form a paint which when applied to a surface results in a coating after drying which is from about 75% to about 97% zinc. A high percentage of zinc in the final coating is very important to the protection that is obtained. Amounts of zinc less than about 88% sharply reduces the desired galvanic action of the zinc coating because each particle of zinc then tends to be isolated within its own capsule of the vehicle. Since silicate vehicles are generally also dielectrics, the zinc particles in such paints are insulated from each other and from the surface to be protected, and the galvanic action is thereby impaired.

Pigments which could be used include aluminum powder, stainless steel flake, zinc dust, cuprous oxide, iron oxide, chromic oxide, zinc oxide, antimony oxide, carborundum, graphite, chromates, magnesium oxide, magnesium silicate, silicas, aluminum silicates, phthalocyanine blues and greens, quinacciridone reds and similar materials such as the pigments listed in the National Paint, Varnish and Lacquer Pigment Book. It is difficult to establish precise ranges for all of the many pigments that could be used since each color and gloss requires a separate formulation or variation in pigment volume concentration. However, a general statement can be made that normally for about 100 parts of resin solids, the total pigment range would be from about 7 to about 2000 parts. The extremes can be explained as being due to end usage varying from a relatively transparent to a fully hiding and decorative protective coating. Also, the ease of wetting the pigments by the resin as well as personal preferences are involved. A typical zinc dust pigmented coating can be prepared at about 20 lbs. of zinc dust to about 5.25 lbs. of resin and will result in about 96% to about 97% zinc content when cured. Another commercially acceptable proportion is about 15 lbs. of zinc dust to 6.5 lbs. of resin. These proportions are given only for illustrative purposes since, as explained, an extremely wide variation of pigment proportion is possible. The resin used in these proportions is the resin solution and not the solids. Normally, the pigmentation is governed by the amount being sufficient to prevent the cured coating from crazing or shrinking and from not being overly loaded to cause excessive chalking or dusting.

Paints formulated with the borate containing vehicle as set forth in this example may be used with appropriate pigments and can be used as a top coat, finish coat, or as a primer. This is true because coatings so formed have better hardness and toughness characteristics than other types of silicate polymer paints such as those that contain a titanate instead of a borate. Paints made in accordance with this example are so adhesive that they can be applied to metal which has been treated only by pickling and not by the usually required sandblasting. Borate paints are also generally more stable than those containing titanates as evidenced by their having substantially longer shelf-lives.

EXAMPLE II

| Ingredients: | Parts by weight |
| --- | --- |
| Cellosolve | 13.45 |
| Ethanol 95 | 17.98 |
| Ethyl cellulose | .82 |
| Butanol | 11.25 |
| Ethyl silicate 40 | 47.00 |
| 1% HCl | 3.50 |
| 10% vinyl resin in butanol | 1.00 |
| 20% borate in butanol | 1.00 |

These materials are combined and reacted as in Example I and thereafter at least five minutes after the borate is added, 4.00 parts by weight of 10% silane in butanol is added. Various silanes of the ambifunctional types including vinyl trimethoxy silanes have been used with success. It is preferable to keep the silanes in the range from about 0.2 to about 0.5% in the final vehicle mixture although it is possible to use greater and lesser amounts with varying degrees of success. The silanes are used as coupling agents for adhesion under various conditions. The silanes form molecular bridges between the organo resins and hydroxyl containing substrates. The chemical names which exemplify this ambifunctional group are:

n(trimethoxysilylpropyl) ethylenediamine,
n(dimethoxymethylsilylisobutyl) ethylenediamine,
γ methacryloxypropyltrimethoxysilane,
γ glycidoxypropyltrimethoxysilane,
vinyltrichlorosilane,
methylvinyldichlorosilane,
vinyltriacetoxysilane,
γ chloropropyltrimethoxysilane and
vinyltrimethoxysilane.

These are commonly referred to as the organo-silanes. These organo-functional groups operating on silicon have the same reactivity they would have as organic molecules and they are used principally to improve the adhesion and the water resistance on immersion of the coatings in which they exist.

When the substances of Example II are used they usually result in a resin containing about 20% $SiO_2$ and it has been found that such a vehicle has even greater adhesive properties and a faster drying time than formulations that use only a borate. It has also been found that when borate is left out altogether a vehicle results which may be applied with even better success from some standpoints to metal that has not been prepared in advance as by being sandblasted, and the vehicle without any borate has been found to have at least about 20% longer shelf-life than other forms of the vehicles and even longer shelf-life when compared to titanate vehicles.

EXAMPLE III

| Ingredients: | Parts by weight |
|---|---|
| Cellosolve | 13.45 |
| Ethanol 95 | 17.98 |
| Ethyl cellulose | .82 |
| Butanol | 11.25 |
| Ethyl silicate 40 | 47.00 |
| 1% HCl in water | 3.50 |
| 10% vinyl resin in butanol | 1.00 |

These materials are combined and reacted as in Example I and after at least about five minutes and under agitation at room temperature or above, 3.00 parts by weight of butanol and 1.00 part by weight of 10% silane in butanol are added. A description of the types of silanes that can be used is set forth in Example II. At least five minutes later 1.00 part by weight of 20% borate in butanol is added. The reaction of the borate usually takes place much slower and may take as long as three days or more to complete, but since this part of the reaction can be carried out in the shipping container in which the product is sold no manufacturing problem is presented. This example shows an alternate method of creating a vehicle that is the same or similar to the vehicle of Example II.

EXAMPLE IV

| Ingredients: | Parts by weight |
|---|---|
| Cellosolve | 13.45 |
| Ethanol 95 | 17.98 |
| Ethyl cellulose | .82 |
| Butanol | 11.25 |
| Ethyl silicate 40 | 47.00 |
| 1% HCl in water | 3.50 |
| 10% vinyl resin in butanol | 1.00 |

These materials are combined and reacted as in Example I and after at least about five minutes and under agitation conditions at room temperature or above, 4.80 parts by weight of butanol and 0.20 part by weight of aluminum chloride which is a Lewis acid are added. Magnesium chloride which is another Lewis acid could also be used. The Lewis acids are potential reactants and their cost normally governs their use in a particular vehicle. The Lewis acids are alternates to the borates and are used when it is desired to improve the coating hardness characteristics and to further accelerate the cure cycle.

Example IV results in a resin containing about 20% $SiO_2$. This formulation has the advantage over some of the others of having increased film hardness and increased speed of cure. The controlling factor in deciding which Lewis acid to use is usually based on availability and cost rather than on chemical considerations.

EXAMPLE V

| Ingredients: | Parts by weight |
|---|---|
| Cellosolve | 13.45 |
| Ethanol 95 | 17.98 |
| Ethyl cellulose | .82 |
| Butanol | 11.25 |
| Ethyl silicate 40 | 47.00 |
| 1% HCl in water | 3.50 |
| 10% vinyl resin in butanol | 1.00 |

These materials are combined and reacted as in Example I and after at least five minutes and under agitation at room temperature or above, about 0.20 part by weight of magnesium chloride and about 0.80 part by weight of butanol are added. After at least about five more minutes, 4.00 parts by weight of 10% silane in butanol are added. The resultant product is one that has relatively good film hardness and adhesion characteristics and a relatively short curing time.

EXAMPLE VI

Charge into a reaction vessel with agitation and at room temperature the following ingredients in the order set forth:

| Ingredients: | Parts by weight |
|---|---|
| Butanol | 11.25 |
| Ethanol 95 | 11.25 |
| Ethyl silicate 40 | 47.00 |
| 1% HCl in water | 3.50 |

After at least five minutes of agitation the above mixture should be allowed to react exothermally for at least about three hours to produce the desired hydrolysis. Thereafter, under agitation conditions, 5.00 parts by weight of 10% vinyl resin in butanol are added and allowed to react until the resultant composition forms a clear composition. 1.00 part by weight of 10% borate in butanol is then added and again allowed to react until the result again reaches a clear condition. The type of borates that can be used are the same as described above. Next 21.00 parts by weight of 4% ethylcellulose in water free solvent are added under agitation, which ingredient reacts in an ester interchange with the vinyl borate silicate terpolymer. The resulting vehicle has properties similar to those obtained in Example I.

EXAMPLE VII

Charge into a reaction vessel with agitation at room temperature the following:

| Ingredients: | Parts by weight |
|---|---|
| Cellosolve | 12.45 |
| Ethanol 95 | 6.40 |
| Ethyl cellulose | .40 |

Then continuing to agitate add:

| | |
|---|---|
| Ethyl silicate 40 | 70.05 |
| ½% HCl in water | .70 |

The agitation is then stopped and the resultant mixture is allowed to exothermally react. Thereafter, under resumed agitation, 2.50 parts by weight of 10% vinyl resin in butanol are added and at least five minutes later 7.50 parts by weight of 10% borate in butanol are also added. This example results in a vehicle having at least 30% silica in the final product.

EXAMPLE VIII

Charge into a reaction vessel with agitation at room temperature the following:

| Ingredients: | Parts by weight |
|---|---|
| Cellosolve | 13.45 |
| Ethanol 95 | 17.98 |
| Ethyl cellulose | .82 |
| Butanol | 11.25 |
| Ethyl silicate 40 | 47.00 |
| ½% HCl in water | 3.50 |
| 10% vinyl resin in butanol | 1.00 |

These materials are combined and reacted as in Example I and after at least five minutes and under agitation at room temperature or above, 4.00 parts by weight of 10% alkyl titanate in butanol are added. After at least five more minutes, 1.00 part by weight of 20% silane in butanol isadded. Various alkyl titanates of the tetra functional types can be used including tetra isopropyl titanate, tetra n butyl titanate and tetra 2 ethyl hexyl titanate, as well as others capable of producing transesterification and esterification. These can be described as those of the organo titanate group and refer to the ethyl, isopropyl and butyl groups specifically. Typical of these are the tetra alkanol titanates. Titanate is included in some formulations to assure a rapid cure in extreme low humidity environments. The titanate radical serves as a moisture scavenger and substantially shortens the cure time. Other examples of the titanates are the tetra ethyl titanates and the chloro containing titanates. Normally, however, the simpler alkanol titanates are preferred.

The resulting formulation is a resin containing about 20% $SiO_2$ which has better adhesive characteristics than those that include a titanate alone.

EXAMPLE IX

Charge into a reaction vessel with agitation at room temperature the following ingredients in the amounts indicated:

| Ingredients: | Parts by weight |
| --- | --- |
| Cellosolve | 13.45 |
| Ethanol 95 | 17.98 |
| Ethyl cellulose | .82 |
| Butanol | 11.25 |
| Ethyl silicate 40 | 47.00 |
| ½ HCl in water | 3.50 |
| 10% vinyl resin in butanol | 1.00 |

These ingredients are combined and reacted as in Example I and after at least five minutes and under agitation at room temperature or above, 1.00 part by weight of an ingredient such as 20% borate in butanol is added. After at least five more minutes, 4.00 parts by weight of 10% alkyl titanate in butanol are added. This produces a resin containing about 20% $SiO_2$, which resin has better stability and adhesion characteristics than those resins that have a titanate additive alone.

This formulation results in a resin containing 20% $SiO_2$. In Examples VIII and IX, the order in which the additives are reacted with the vinyl ethyl silicate can be reversed if desired without producing any undesirable results.

Thus there has been disclosed several different forms of a vehicle for use in coating substances such as paints and the like which fulfill all of the objects and advantages sought therefor. It is apparent, however, that many changes, variations, modifications, and other combinations and amounts of the ingredients disclosed and of the manner of mixing and reacting them are possible without departing from the spirit and scope of the invention. The invention is intended to cover all such changes, variations modifications and combinations which do not depart from the spirit and scope of the invention and is limited only by the claims which follow.

What is claimed is:

1. A reaction vehicle for use in protective coating substances including in combination a resin bearing solvent formed by a mixture of glycol ether, and alcohol and ethyl cellulose; a silicate formed by an alcohol, an ethyl silicate and a weak acid in the presence of a water solution hydrolyzed in a range from about 40% to about 100%; ester interchanges taking place during the reaction between the resin bearing solvent and the silicate; and a material chosen from any one or more of the members of a group consisting of the alkanol borates of methyl borate, trimethyl borate, and boric acid, the ambifunctional organo silanes of vinyltrimethoxysilane, n(trimethoxysilylpropyl)ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane, and γ chloropropyltrimethoxysilane, and the Lewis acids of aluminum chloride and magnesium chloride, said resin bearing solvent being present in the vehicle in an amount by weight of from about 60% to about 90%, said hydrolyzed silicate being present in the vehicle in an amount by weight of from about 10% to about 40%, said material from the group consisting of any one or more of the alkanol borates, ambifunctional organo silanes and Lewis acids being present in an amount by weight of the vehicle solids of from about 0.5% to about 15.0%.

2. The reaction vehicle of claim 1 including the addition of an organo cellulose ingredient with an ethoxy substitution between 45.5 and 49.0% and a viscosity range when cut in toluene-ethanol (80:20) at a 5% concentration of 80 or more centipoise.

3. The reaction vehicle of claim 2 including a pigment, said pigment being present in the vehicle in a range from about 7 to about 2000 parts per hundred parts of vehicle.

4. The reaction vehicle of claim 3 wherein the pigment is chosen from the group consisting of zinc, iron oxide, titanium oxide, chromium oxide and carbon black.

5. A silicate polymer vehicle for use in protective coating substances and the like comprising in combination in a partially hydrolyzed vinyl ethyl silicate solution hydrolyzed in a range from about 40% to about 100%, said partially hydrolyzed vinyl ethyl silicate solution being obtained by reacting a mixture that includes an ethyl cellulose ingredient, an ethyl silicate ingredient, and a weak acid, which ingredients in reacting undergo hydrolysis and an ester interchange, and a hardening agent chosen from any one or more of the members of a group consisting of the alkano borates of methyl borate, trimethyl borate, and boric acid, the ambifunctional organo silanes of vinyltrimethoxysilane, n(trimethoxysilylpropyl) ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane and γ chloropropyltrimethoxysilane, and the Lewis acids of aluminum chloride and magnesium chloride, said hardening agent being present in the vehicle in an amount by weight of the vehicle solids in a range from about 0.1% to about 15.0%.

6. The vehicle set forth in claim 5 including an alkanol titanate additive in an amount representing from about 0.1% to about 15.0% by weight of the vehicle solids, said alkanol titanate being selected from the group consisting of tetra isopropyl titanate, tetra n butyl titanate and tetra 2 ethyl hexyl titanate.

7. The vehicle set forth in claim 5 including the addition of ethyl cellulose in an amount representing from about 0.25% to about 15.0% by weight of the vehicle solids.

8. A vehicle for paint comprising a partially hydrolyzed vinyl ethyl silicate hydrolyzed in a range from about 40% to about 100%, said silicate representing from about 10% to about 40% by weight of the vehicle, said partially hydrolyzed vinyl ethyl silicate solution being obtained by reacting a mixture that includes an ethyl cellulose ingredient, an ethyl silicate ingredient and a weak acid, which ingredients in reacting undergo hydrolysis and an ester interchange, in combination with a mixture of any two hardening agents chosen from the group consisting of the organo borates of methyl borate, trimethyl borate, and boric acid, the ambifunctional organo silanes of vinyltrimethoxy silane, n(trimethoxysilylpropyl) ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane, and γ chloropropyltrimethoxysilane, and the Lewis acids of aluminum chloride and magnesium chloride, said two hardening agents together being present in the vehicle in a range from about 0.1% to about 15.0% by weight of the silicate.

9. The vehicle set forth in claim 8 including the addition of an organo titanate additive in an amount representing from about 0.1% to about 15.0% by weight of the silicate, said organo titanate aditive being selected from the group consisting of tetra isopropyl titanate, tetra n butyl titanate, tetra 2 ethyl hexyl titanate.

10. A vehicle for paint comprising a vinyl ethyl silicate hydrolyzed in a range from about 40% to about 100% and representing from about 10.0% to about 40.0% by weight of the vehicle, said partially hydrolyzed vinyl ethyl silicate solution being obtained by reacting a mixture that includes an ethyl cellulose ingredient, an ethyl silicate ingredient, and a weak acid, which ingredients in reacting undergo hydrolysis and an ester interchange, and one or more additives selected from the group consisting of methyl borate, trimethyl borate, boric acid, vinyltrimethoxysilane, n(trimethoxysilylpropyl) ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane, γ chloropropyltrimethoxysilane, aluminum chloride and magnesium chloride, said additive being present in combination in the vehicle in a range from about 0.2% to about 15.0% by weight of the vehicle solids.

11. The vehicle set forth in claim 10 including the addition of an organo titanate ingredient present in a range from about 0.1% to about 15.0% by weight of the vehicle solids, said organo titanate ingredient being selected from the group consisting of tetra isopropyl titanate, tetra n butyl titanate, tetra 2 ethyl hexyl, titanate.

12. A process for manufacture of a vehicle for use in paints including mixing together and reacting a vinyl ethyl silicate hydrolyzed in a range from about 40% to about 100%, said partialy hydrolyzed silicate being present in the vehicle in a range from about 10% to about 40% by weight of the vehicle, said partially hydrolyzed vinyl ethyl silicate solution obtained by reacting a mixture that includes an ethyl cellulose ingredient, an ethyl silicate ingredient, and a weak acid, which ingredients in reacting undergo hydrolysis and an ester interchange, and a substance chosen from the group consisting of the organo borate of methyl borate, trimethyl borate, and boric acid, the ambifunctional organo silanes of vinyltrimethoxy silane, n(trimethoxysilylpropyl) ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane, and γ chloropropyltrimethoxysilane and the Lewis acids of aluminum chloride and magnesium chloride, said substance being in the vehicle in an amount representing from about 0.1% to about 15.0% by weight of the solids in the vehicle.

13. The process of claim 12 including the further step of reacting an organo titanate into the mixture in an amount representing from about 0.1% to about 15.0% by weight of the solids present in the vehicle, said organo titanate being selected from the group consisting of tetra isopropyl titanate, tetra n butyl titanate, tetra 2 ethyl hexyl titanate.

14. A process for the manufacture of a vehicle for use in protective coatings and the like including the steps of mixing together in the presence of a mutually compatible solvent selected of a group of water and non-water and non-water bearing solvents and reacting at a temperature between about 25° C. and about 150° C. to produce an ester interchange, a partially hydrolyzed vinyl ethyl silicate and cellulose, said silicate being hydrolyzed in a range from about 40% to about 100% and representing from about 10% to about 40% by weight of the vehicle, said reaction taking place within from about five minutes to several days or longer depending on the temperature of the reaction, mixing together and reacting the resultant composition at a temperature between about 25° C. and about 105° C. with a substance chosen from the group consisting of one or more of the following substances from the group consisting of methyl borate, trimethyl borate, boric acid, vinyltrimethoxysilane, n(trimethoxysilylpropyl) ethylenediamine, n(dimethoxymethylsilylisobutyl) ethylenediamine, γ methacryloxypropyltrimethoxysilane, γ glycidoxypropyltrimethoxysilane, vinyltrichlorosilane, methylvinyldichlorosilane, vinyltriacetoxysilane, γ chloropropyltrimethoxysilane, aluminum chloride and magnesium chloride in an amount from about 0.1% to about 15.0% by weight of the resulting solids.

15. The process of claim 14 including the further step of adding from about 0.1% to about 15.0% by weight of the vehicle solid an alkanol titanate selected from a group consisting of tetra isopropyl titanate, tetra n butyl titanate, tetra 2 ethyl hexyl titanate.

16. The process of claim 14 including the further step of adding an amount of pigment to the vehicle in a range from about 7 parts to about 2000 parts of pigment per 100 parts of the vehicle.

References Cited

UNITED STATES PATENTS

| | | | |
|---|---|---|---|
| 3,392,036 | 7/1968 | McLeod | 106—1 |
| 3,247,147 | 4/1966 | Jarboe | 106—14 X |
| 2,645,628 | 7/1953 | Hurd | 260—46.5 UA |
| 2,452,416 | 10/1948 | Wright | 260—448.2 R |
| 3,392,130 | 7/1968 | Rucker | 106—14 |
| 2,820,806 | 1/1958 | Haslam | 260—448.8 A |
| 2,952,562 | 9/1960 | Morris | 106—14 |

OTHER REFERENCES

Official Digest, June 1951, "Butyl Titanate: Preparation, Polymerization and Use in Paint," G. Winter.

THEODORE MORRIS, Primary Examiner

U.S. Cl. X.R.

106—14, 193, 194

UNITED STATES PATENT OFFICE
CERTIFICATE OF CORRECTION

Patent No. 3,730,746         Dated May 1, 1973

Inventor(s)  Donald P. Boaz

It is certified that error appears in the above-identified patent and that said Letters Patent are hereby corrected as shown below:

Column 2, line 57, "event" should be "even".

Column 8, line 59, "isadded" should be "is added".

Column 9, line 12, after "1/2" insert "%".

Column 10, line 60, "aditive" should be "additive".

Column 11, line 12, after "hexyl" cancel the comma (,).

Signed and sealed this 15th day of January 1974.

(SEAL)
Attest:

EDWARD M. FLETCHER, JR.         RENE D. TEGTMEYER
Attesting Officer               Acting Commissioner of Patents